(12) United States Patent
Tarhan et al.

(10) Patent No.: US 7,210,569 B1
(45) Date of Patent: May 1, 2007

(54) TRANSFER DEVICE FOR CONVEYOR BELT

(75) Inventors: Nuri Tarhan, Smithtown, NY (US); E. John Wieman, Plainview, NY (US)

(73) Assignee: Tarpaulin.com, Inc., Woodbury, NY (US)

( * ) Notice: Subject to any disclaimer, the term of this patent is extended or adjusted under 35 U.S.C. 154(b) by 9 days.

(21) Appl. No.: 11/054,030

(22) Filed: Feb. 9, 2005

Related U.S. Application Data

(60) Provisional application No. 60/543,362, filed on Feb. 9, 2004.

(51) Int. Cl.
*B65G 37/00* (2006.01)
(52) U.S. Cl. ...................................... 198/599; 198/600
(58) Field of Classification Search ................ 198/599, 198/600
See application file for complete search history.

(56) References Cited

U.S. PATENT DOCUMENTS

| | | | |
|---|---|---|---|
| 3,206,001 A * | 9/1965 | Peppler | 198/728 |
| 4,067,428 A | 1/1978 | Shuttleworth | |
| 5,044,485 A * | 9/1991 | Loder | 198/325 |
| 5,215,182 A * | 6/1993 | Garbagnati | 198/635 |
| 5,228,554 A * | 7/1993 | Kuchta et al. | 198/635 |
| 5,584,373 A | 12/1996 | Layne | |
| 5,605,222 A * | 2/1997 | Huberty et al. | 198/841 |
| 5,634,550 A * | 6/1997 | Ensch et al. | 198/457.05 |
| 5,908,104 A * | 6/1999 | Brun-Jarret | 198/324 |
| 5,957,265 A * | 9/1999 | Clopton | 198/600 |
| 6,068,107 A | 5/2000 | Brun-Jarret | |
| 6,164,435 A | 12/2000 | Coen et al. | |
| 6,439,365 B1 * | 8/2002 | Kubota | 198/324 |
| 6,508,153 B1 * | 1/2003 | Lumberg et al. | 83/318 |
| 6,959,803 B1 * | 11/2005 | Layne et al. | 198/600 |

FOREIGN PATENT DOCUMENTS

JP  1313253 A  12/1989

* cited by examiner

*Primary Examiner*—Douglas A. Hess
(74) *Attorney, Agent, or Firm*—Hoffmann & Baron, LLP

(57) ABSTRACT

A transfer device for transferring small items from one conveyor belt to another includes a plurality of independent wedge-shaped sections, supported by at least one rod. A tapered end of each section is preferably positioned proximate a moving conveyor belt. Each wedge-shaped section includes a substantially smooth continuous surface extending across the gap between the conveyor belts. The smooth surfaces are coplanar with the surfaces of the belts and help prevent tipping of items transferred.

14 Claims, 3 Drawing Sheets

TRANSFER DEVICE FOR CONVEYOR BELT

This application claims the benefit of U.S. Provisional Application No. 60/543,362, filed on Feb. 9, 2004.

BACKGROUND OF THE INVENTION

The present invention is directed to a device for use in a conveyor belt application and, more particularly, to a transfer device for facilitating the transfer of small items between adjacent conveyor belts.

As will be recognized by those skilled in the art, many conveyor belt applications involve the use of multiple belts. The belts are typically configured in an end-to-end configuration. Such configurations, though, often result in a gap being formed between the moving surfaces of the adjacent belts due to the turning radius required for many such belts. This gap is particularly problematic when the conveyor belts are used to transport small items. Although the prior art has made various attempts to address this problem, there still exists a need in the art for a transfer device which can span the gap between adjacent belts and facilitate the transfer of small items thereacross.

SUMMARY OF THE INVENTION

The present invention, which addresses the needs of the prior art, relates to a transfer device for transferring objects from a first conveyor belt to a second conveyor belt. The transfer device includes a plurality of wedge-shaped sections. The wedge-shaped sections are positioned to substantially span the gap between a first moving surface of the first conveyor belt and a second moving surface of the second conveyor belt. Each wedge-shaped section includes at least one tapered end, which is positioned proximate to one of the conveyor belts. Each wedge-shaped section further includes a substantially smooth continuous surface substantially extending from the first moving surface to the second moving surface, and which is substantially coplanar with the first moving surface and the second moving surface. At least one rod is positioned substantially perpendicular to a direction of movement associated with the first moving surface and the second moving surface. The rod supports the plurality of wedge-shaped sections.

In one preferred embodiment, the plurality of wedge-shaped sections are positioned in proximate side by side relationship across a width defined by the first conveyor belt and the second conveyor belt. Each wedge-shaped section is freely vibrated by movement of the conveyor belt with which the section is contacted.

In another preferred embodiment, each wedge-shaped section may further include a plurality of rollers. The rollers are free to rotate around an axis of rotation, wherein the axis of rotation is substantially perpendicular to and substantially in the plane of the direction of movement associated with items being transferred from the first moving surface to the second moving surface. Preferably, the rollers are rotatably supported by and rotate about the rod.

The present invention further relates to a combination of a conveyor system for moving objects and a transfer device for transferring objects. The conveyor system includes a first conveyor belt having a first moving surface and a second conveyor belt having a second moving surface. The second conveyor belt receives objects from the first conveyor belt, and the conveyor system is characterized by a gap between the first moving surface and the second moving surface. The transfer device, which transfers the objects from the first conveyor belt to the second conveyor belt, includes a plurality of wedge-shaped sections. The plurality of wedge-shaped sections are positioned to substantially span the gap between the first moving surface and the second moving surface. Each wedge-shaped section includes at least one tapered end which contacts at least one of the conveyor belts. Each wedge-shaped section also includes a substantially smooth continuous surface substantially extending from the first moving surface to the second moving surface, where the substantially smooth continuous surface is substantially coplanar with the moving surfaces of the conveyor belts. The transfer device further includes at least two flexible rods positioned substantially perpendicular to a direction of movement associated with the moving surfaces. The flexible rods loosely support the plurality of wedge-shaped sections, which are positioned in proximate side by side relationship across the width of the conveyor belts. Each wedge-shaped section is freely vibrated by movement of the conveyor belt with which the section is contacted.

As a result, the present invention provides a transfer device that spans the gap between existing conveyor belts and facilitates the transfer of small items across these belts.

DETAILED DESCRIPTION OF THE INVENTION

Figure 1:
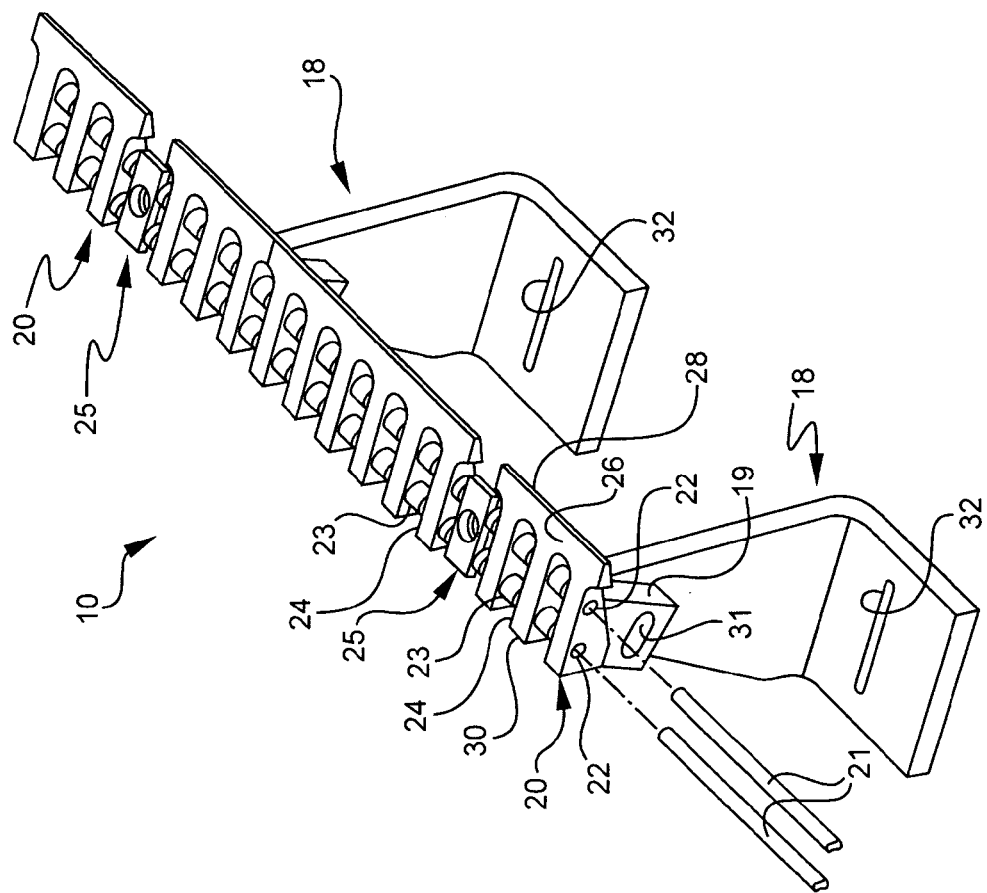
FIG. 1 is a perspective view of a transfer device formed in accordance with the present invention.

It has been discovered herein that a transfer device, as described hereinbelow, can be utilized to span the gap between adjacent conveyor belts and thus facilitate the transfer of items thereacross, especially small items. In particular, a transfer device 10 (as shown in FIG. 1) is used to span the gap which is created between the junction of two separate conveyor belts, i.e., belt 12 and belt 14 shown in FIG. 2. In one preferred embodiment, belt 12 is a conventional conveyor belt having a turning radius of R1, while belt 14 is a specialty belt having a substantially reduced turning radius. Of course, belt 14 may also be a conventional conveyor belt.

Figure 2:
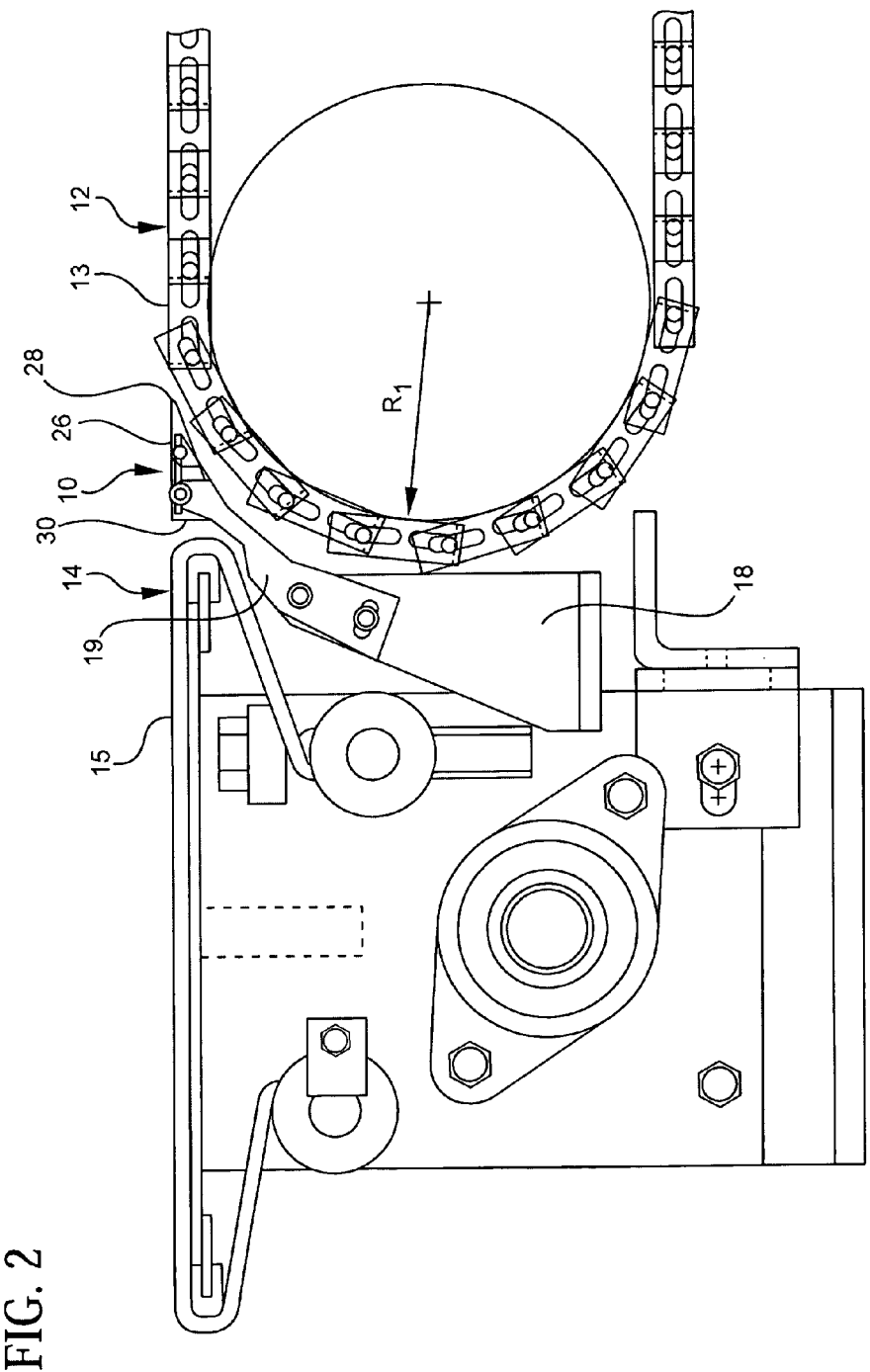
FIG. 2 is a side view of a transfer device formed in accordance with the present invention integrated into a conveyance system.
Figure 3:
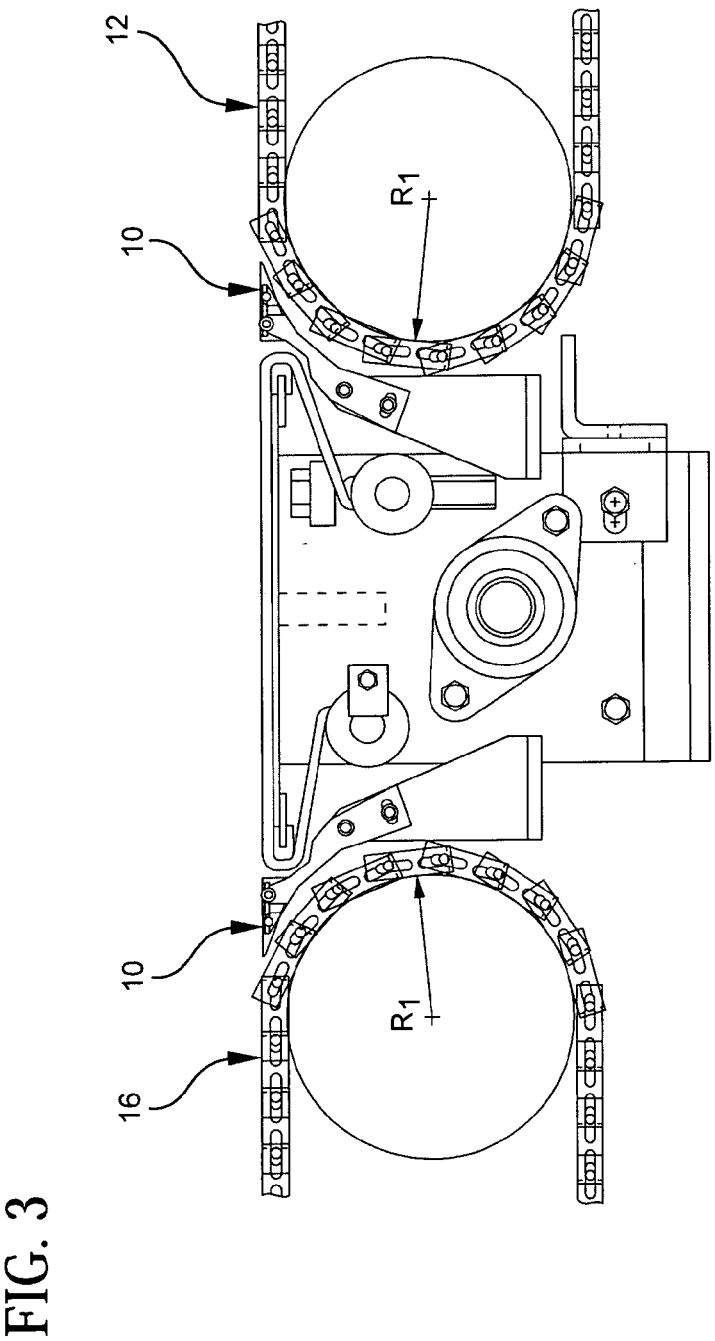
FIG. 3 is a side view of two transfer devices integrated into a conveyance system.

Referring now to FIGS. 2 and 3, the direction of belt travel is from right to left. For example, in FIG. 2, items are transferred from a first conveyor belt 12, characterized by a first moving surface 13, to a second conveyor belt 14, characterized by a second moving surface 15. The term "moving surface" as used herein, refers to the portion of a moving belt at a given time, which is substantially horizontal and on which items may be transported.

As shown in FIG. 3, belt 14, which has a reduced turning radius, may be utilized between conventional conveyor belt 12 (having turning radius $R_1$) and a second conventional conveyor belt, i.e., belt 16 (also having a turning radius $R_1$). It will be appreciated by those skilled in the art that the required turning radius of belts 12 and 16 prevents such belts from being positioned sufficiently close to one another as to provide a continuous transport surface. When transporting larger-sized items, the use of belt 14 (or another such belt) is often times adequate. However, when transporting smaller-sized items, the gap which remains between the conventional conveyor belt and the known intermediate belts (e.g., belt 14) is sufficiently large as to negatively impact the smooth transportation of the items across such gap.

As mentioned, transfer device 10 is particularly useful when the conveyor belts are being used to transport small items. It will be appreciated by those skilled in the art that small items often times become misoriented when moving between adjacent belts, while top heavy items (e.g., muffins) have a tendency to topple over while moving between adjacent belts.

Transfer device 10 is shown in detail in FIGS. 1 and 2. As shown, transfer device 10 is preferably supported on a bracket assembly 18. The transfer device itself is preferably comprised of a pair of opposing leveling arms 19 which support a plurality of individual tapered wedge-shaped sections 20, the wedge-shaped sections being mounted on at least one, and preferably two, rods 21. The rods, which are preferably flexible, extend through apertures 22. A plurality of rollers 23 are preferably positioned within slots 24 formed in wedge-shaped sections 20. The wedge-shaped sections are preferably made out of a hard material, e.g., plastic.

In one preferred embodiment, the flexible rods loosely support the wedge-shaped sections 20, thereby allowing each wedge-shaped section 20 to vibrate up and down. The vibrating of the wedge-shaped sections 20 is caused by the movement of the conveyor belts. Particularly, the tapered end of the wedge contacts the belt and is vibrated as the belt moves therepast. It is the combination of this vibrating action and the initial momentum imparted on the item by the movement of the belt which causes the item (e.g., the muffin) to pass over the transfer device 10. Thus, the transfer device 10 itself is not driven, but rather relies upon the motion of the conveyor belt to vibrate the wedge-shaped sections 20, which in turn cause the food items to travel across the sections 20 and onto the adjacent belt.

Wedge-shaped sections 20 are positioned to substantially span the gap between adjacent conveyor belts. In addition, wedge-shaped sections 20 are positioned in proximate side by side relationship across a width defined by the conveyor belts. The width may be further defined as the width at the intersection of the moving surfaces of adjacent belts along which items may be transferred, measured substantially perpendicular to the direction of movement of transferred items. Some of the sections 20 may be placed with adjacent sides directly contacting. Others may be in side by side relationship, separated by a space occupied by, for example, a rod hold-down clip 25.

Device 10 includes at least one, and preferably at least two, clips 25, located across the width of the belts. Clips 25 are positioned between adjacent wedge-shaped sections 20, and preferably extend across the two flexible rods. In this regard, clips 25 provide stability to the structure by preventing substantial bowing of the flexible rods across the width of the belts. Clips 25, therefore, help to maintain surfaces 26 of wedge-shaped sections 20 substantially coplanar with the moving surfaces of adjacent belts.

As shown in FIG. 1, each wedge-shaped section 20 provides a substantially smooth and continuous planar surface 26 which extends from edge 28 to edge 30. This substantially continuous planar surface 26 facilitates the movement of small items between the adjacent belts. In particular, surface 26 allows the item(s) to smoothly travel over the transfer device 10 without becoming lodged in any gaps or toppling over. Each section 20 further includes at least one tapered end at edge 28, which contacts one of the adjacent moving belts and freely vibrates due to the movement of the belt.

Leveling arm 19 is preferably attached to and supported by bracket assembly 18. Leveling arm 19 provides adjustability in positioning the plurality of wedge-shaped sections 20 to substantially span the gap between the first conveyor belt 12 and the second conveyor belt 14, and in positioning surfaces 26 substantially coplanar with the moving surfaces of the respective belts. In this regard, each of the opposing leveling arms 19 preferably includes a slotted hole 31 to provide the mentioned adjustability. Bracket assembly 18 may also include slots 32 for locating adjustability.

In one alternative embodiment, each wedge-shaped section includes two tapered ends. At least one tapered end contacts a moving conveyor belt. This embodiment may be used, for example, between two equally large turning radius conveyor belts, the two tapered ends being more easily positioned close to the moving surface of each belt. Of course, the particular shape and size of the tapered end may be modified according to the shape and size of the belt the tapered end is designed to contact.

It will be appreciated by those skilled in the art that transfer device 10 may be made in various sizes and configured to span different-sized gaps. The unique design of the transfer device 10 allows edge 28 to be located close to and substantially planar with the moving surface of a conventional conveyor belt. Consequently, any existing conveyance system previously designed and used to transport larger-sized items can easily be retrofitted with transfer device 10 for subsequent use in the conveyance of smaller-sized items.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A transfer device for transferring objects from a first conveyor belt to a second conveyor belt, comprising:
 a plurality of wedge-shaped sections, the plurality of wedge-shaped sections positioned to substantially span a gap between a first moving surface of the first conveyor belt and a second moving surface of the second conveyor belt, wherein each wedge-shaped section comprises:
 at least one tapered end, the at least one tapered end positioned proximate at least one of the first conveyor belt and the second conveyor belt;
 a substantially smooth continuous surface substantially extending from the first moving surface to the second moving surface, the substantially smooth continuous surface being substantially coplanar with the first moving surface and the second moving surface; and
 an aperture extending therethrough in a direction parallel to said tapered end; and
 a first rod positioned substantially perpendicular to a direction of movement associated with the first moving surface and the second moving surface, the first rod extending through said apertures and supporting the plurality of wedge-shaped sections, the plurality of wedge-shaped sections being positioned in proximate side by side relationship across a width defined by the first conveyor belt and the second conveyor belt.

2. The transfer device of claim 1, wherein the at least one tapered end is positioned to contact at least one of the first conveyor belt and the second conveyor belt, and wherein each wedge-shaped section is freely vibrated by movement of the at least one of the first conveyor belt and the second conveyor belt.

3. The transfer device of claim 2, wherein the first and second rods loosely support the plurality of wedge-shaped sections, and wherein the rods are sufficiently flexible to facilitate vibration of the wedge-shaped sections therealong.

4. The transfer device of claim 1, further comprising a second rod positioned substantially perpendicular to the direction of movement associated with the first moving surface and the second moving surface, the first and second rods supporting the plurality of wedge-shaped sections.

5. The transfer device of claim 4, wherein each wedge-shaped section further comprises a plurality of rollers, the plurality of rollers being free to rotate around an axis of rotation substantially perpendicular to the direction of movement associated with the first moving surface and the second moving surface.

6. The transfer device of claim 5, wherein each wedge-shaped section further comprises at least one slot extending in the direction of movement associated with the first and second moving surfaces, the plurality of rollers being positioned within the slot.

7. The transfer device of claim 6, wherein the plurality of rollers are rotatably supported by and rotate about one of the first and second rods.

8. The transfer device of claim 7, further comprising at least one rod hold down clip positioned between adjacent wedge-shaped sections and extending across the first and second rods, the at least one clip positioned to prevent substantial bowing of the rods along the length thereof.

9. The transfer device of claim 4, further comprising a pair of leveling arms for supporting the plurality of wedge-shaped sections and for positioning the sections to substantially span the gap between the first moving surface and the second moving surface, and for positioning the substantially smooth continuous surface of each of the sections to be substantially coplanar with the first moving surface and the second moving surface.

10. The transfer device of claim 9, further comprising a bracket assembly for supporting and locating said leveling arms thereagainst.

11. The transfer device of claim 10, wherein said leveling arms and said bracket assembly include slotted apertures for improved adjustability.

12. The transfer device of claim 4, wherein the at least one tapered end is two tapered ends.

13. The transfer device of claim 12, wherein one of the two tapered ends contacts one of the first conveyor belt and the second conveyor belt.

14. In combination:
a conveyor system for moving objects comprising a first conveyor belt comprising a first moving surface and a second conveyor belt comprising a second moving surface, the second conveyor belt receiving objects from the first conveyor belt, the conveyor system being characterized by a gap between the first moving surface and the second moving surface; and
a transfer device for transferring objects from the first conveyor belt to the second conveyor belt, comprising:
a plurality of wedge-shaped sections, the plurality of wedge-shaped sections positioned to substantially span the gap between the first moving surface and the second moving surface, wherein each wedge-shaped section comprises:
at least one tapered end, the at least one tapered end contacting at least one of the first conveyor belt and the second conveyor belt; and
a substantially smooth continuous surface from the first moving surface to the second moving surface, the substantially smooth continuous surface being substantially coplanar with the first moving surface and the second moving surface; and
at least two flexible rods positioned substantially perpendicular to a direction of movement associated with the first moving surface and the second moving surface, the at least two flexible rods loosely supporting the plurality of wedge-shaped sections, the plurality of wedge-shaped sections being positioned in proximate side by side relationship across a width associated with the first conveyor belt and the second conveyor belt,
wherein each wedge-shaped section is freely vibrated by movement of the at least one of the first conveyor belt and the second conveyor belt.

* * * * *